United States Patent
Kitaura et al.

(10) Patent No.: US 11,806,841 B2
(45) Date of Patent: Nov. 7, 2023

(54) MAGNETIC CLAMPING DEVICE, AND MAGNETIC FORCE GENERATING MECHANISM FOR MAGNETIC CLAMPING DEVICE

(71) Applicant: Pascal Engineering Corporation, Itami (JP)

(72) Inventors: Ichiro Kitaura, Itami (JP); Taichiro Kitaura, Itami (JP); Hiroo Hashimoto, Itami (JP)

(73) Assignee: Pascal Engineering Corporation, Itami (JP)

( * ) Notice: Subject to any disclaimer, the term of this patent is extended or adjusted under 35 U.S.C. 154(b) by 389 days.

(21) Appl. No.: 17/251,890

(22) PCT Filed: Jun. 12, 2019

(86) PCT No.: PCT/JP2019/023376
§ 371 (c)(1),
(2) Date: Dec. 14, 2020

(87) PCT Pub. No.: WO2019/240201
PCT Pub. Date: Dec. 19, 2019

(65) Prior Publication Data
US 2021/0122011 A1  Apr. 29, 2021

(30) Foreign Application Priority Data

Jun. 13, 2018 (JP) ................................ 2018-113212

(51) Int. Cl.
*B25B 11/00* (2006.01)
(52) U.S. Cl.
CPC .................. *B25B 11/002* (2013.01)

(58) Field of Classification Search
CPC ............................. B25B 11/002; B25B 11/02
See application file for complete search history.

(56) References Cited

U.S. PATENT DOCUMENTS 11,072,048 B2 * 7/2021 Cardone ............... B25B 11/002
2007/0290780 A1  12/2007 Tiberghien et al.
(Continued)

FOREIGN PATENT DOCUMENTS

JP    2007-331101 A    12/2007
JP    2011-519733 A    7/2011
(Continued)

OTHER PUBLICATIONS

International Search Report dated Sep. 24, 2019, issued in counterpart International Application No. PCT/JP2019/023376 (2 pages).

*Primary Examiner* — Lee D Wilson
(74) *Attorney, Agent, or Firm* — WHDA, LLP

(57) ABSTRACT

A magnetic clamping device is provided with a magnetic force generating mechanism at which a housing cover body comprising soft magnetic material is arranged centrally at a hollow housing portion, a nonmagnetic metal frame body comprising a nonmagnetic body is made to engage with the outside circumference thereof, a plurality of arcuate nonreversible permanent magnets are arranged in annular fashion within an annular magnet housing space at the back of this nonmagnetic metal frame body, a reversible permanent magnet and a magnetic polarity switching coil disposed peripherally with respect thereto are provided at the back of the housing cover body, and a base cover body that blocks a back opening of the hollow housing portion is provided, the magnetic clamping device being characterized in that the metal frame body is joined in integral fashion to the housing cover body and the baseplate.

10 Claims, 7 Drawing Sheets

(56) References Cited

U.S. PATENT DOCUMENTS

| | | | |
|---|---|---|---|
| 2010/0301532 A1* | 12/2010 | Cardone | B23Q 3/154 |
| | | | 248/206.5 |
| 2010/0327787 A1* | 12/2010 | Sakai | H02P 21/22 |
| | | | 318/400.09 |
| 2011/0037547 A1* | 2/2011 | Cardone | B23Q 3/1546 |
| | | | 335/289 |
| 2011/0043310 A1 | 2/2011 | Cardone et al. | |
| 2012/0267837 A1 | 10/2012 | Cardone et al. | |
| 2020/0376617 A1* | 12/2020 | Cardone | B25B 11/002 |
| 2021/0122011 A1* | 4/2021 | Kitaura | B23Q 3/1543 |

FOREIGN PATENT DOCUMENTS

| | | |
|---|---|---|
| JP | 2011-519734 A | 7/2011 |
| JP | 2019-76981 A | 5/2019 |

\* cited by examiner

MAGNETIC CLAMPING DEVICE, AND MAGNETIC FORCE GENERATING MECHANISM FOR MAGNETIC CLAMPING DEVICE

TECHNICAL FIELD

This invention relates to a magnetic clamping device, and in particular to a magnetic clamping device in which a plurality of magnetic force generating mechanisms producing liquid-tightness at a surface to which an object to be clamped is held are arrayed in parallel arrangement within a baseplate, and to the structure of the magnetic force generating mechanisms for that magnetic clamping device.

BACKGROUND ART

There are conventional magnetic clamping devices that are provided with a base member having a securing surface to which an object to be clamped (e.g., a die for an injection molding machine, a workpiece that is to be subjected to machining, etc.) may be secured, and a plurality of securable magnetic force generating mechanisms which are incorporated into this base member and which use magnetic force to cause the object to be clamped to be secured and be held to the securing surface. Such a magnetic clamping device might be, for example, be mounted on an injection molding machine and used when a die is to be secured to the platen (the movable or stationary plate of the injection molding machine that constitutes the surface to which the die is attached).

Each magnetic force generating mechanism in the magnetic clamping device might, for example, be provided with a circular cover plate that is made from magnetic body and that has an outer surface which is coplanar with the securing surface of the base member, an alnico magnet (AlNiCo magnet) that is arranged at the back of this circular cover plate, a magnetic polarity switching coil that is wound around the outside circumference of this AlNiCo magnet, permanent magnets that are arranged about the outside circumference of the circular cover plate, and so forth. In addition, these magnetic force generating mechanisms are respectively incorporated into a plurality of recessed housing holes that are formed in the base members. Now, the magnetic polarity of the AlNiCo magnet can be reversed by causing electricity to flow through the magnetic polarity switching coil. Ability to cause electricity to flow therethrough and magnetic polarity to be reversed makes it possible to achieve rapid and selective switching between a canceling state in which lines of magnetic flux do not leave the securing surface and no securing force is produced, and a clamping state in which lines of magnetic flux extend from the securing surface to reach the die or other such workpiece so that the workpiece is capable of being clamped by a magnetic force. Moreover, because these are employed in combination with permanent magnets, it is possible to cause these states to continue to persist even after flow of electricity therethrough is terminated.

For example, at the magnetic tightening device of Patent Reference No. 1, a plurality of cylindrical housing openings are formed at a workpiece securing surface constituting the surface of a plate of a base member against which the workpiece will be tightened, magnetic force generating mechanisms being respectively incorporated within the respective cylindrical housings. At Patent Reference No. 1, whereas the invention itself relates to connectors for connection to terminals of solenoid coils at that plurality of magnetic force generating mechanisms, at the magnetic force generating mechanisms themselves that are within these cylindrical housings there are, in order from the surface against which the workpiece will be tightened: a centrally arranged steel pole; a cylindrical ring body comprising brass or other such nonmagnetic material that engages with the outer circumferential surface thereof; and a plurality of permanent magnets that surround the outside circumference of the steel pole and that are arranged beneath this cylindrical ring to constitute magnetic pads, a magnetic force switching unit comprising a cylindrical AlNiCo magnet and a solenoid coil which is arranged about the outside circumference thereof being provided below those magnetic pads.

In addition, at Patent Reference No. 1, a ring which is a nonmagnetic body made of brass is arranged at the outer circumferential surface portion of the steel pole, an outer peripheral groove being formed at the outer circumferential surface of this ring, and an O-ring being arranged within this groove.

Furthermore, an integral magnetic device has also been proposed in which a base member and a circular cover plate are formed in integral fashion after the fashion of a single plate as seen from the front (see, for example, Patent Reference No. 2). At the integral magnetic device of Patent Reference No. 2, a first pole piece core corresponding to the circular cover plate and a support structure member serving as base member are formed as a single member, a plurality of recessed housing holes being formed at the back of the support structure member, magnetism generating mechanisms in which nonreversible permanent magnets which are disposed peripherally about the circular cover plate, an AlNiCo magnet that has a reversible permanent magnet core which is disposed beneath the circular cover plate, and an annular electric coil for causing a change in the magnetized state which is disposed peripherally thereabout are arranged being provided within this plurality of housing holes.

PRIOR ART REFERENCES

Patent References

Patent Reference No. 1: Japanese Patent Application Publication Kokai No. 2007-331101

Patent Reference No. 2: International Patent Application Japanese Translation Publication No. 2011-519733

SUMMARY OF INVENTION

Problem to be Solved by Invention

Now, a magnetic clamping device is a device in which switching of electricity supplied to a magnetic polarity switching coil makes it possible to maintain a retaining state in which an object to be clamped is secured and held against a securing surface, or to cause occurrence of a state in which clamping is made not to occur as a result of causing occurrence of a canceling state as a result of reversal of the polarity of an AlNiCo magnet. Because magnetic forces persist even after the flow of electricity through the coil has been terminated, it will be possible for a die to continue to be secured and held while remaining clamped for a long period time such as is the case with the platen of an injection molding machine, and because there are no moving parts, it is fair to say that it can be favorably employed in situations where maintenance-free operation is sought for long periods of time.

However, during injection molding, because, following injection of molten resin into the cavity of the die, time is required for the molded put to cool and/or cure before it can be removed therefrom, the cooling process plays an important role. In addition, such dies are typically cooled using coolant (cooling liquid). This being the case, it may be the case that the area surrounding the die will become wet due to coolant and the like, and it may be the case that the area surrounding the magnetic clamping device will be infiltrated by moisture. Furthermore, with a die of an injection molding machine or the like, because resin and other such debris adheres to the surface of that die, it is frequently the case that the die is cleaned following use, at which time cleaning solution may adhere to the area surrounding the die, and cleaning solution may trickle down therefrom. Where cleaning is performed while this is still clamped to the platen, there may therefore be occurrence of situations in which cleaning solution or other such solution adheres to the securing portion of the magnetic clamping device.

This being the case, while it may be said that the magnetic clamping device has no moving parts and is suited to holding items in a clamped state for a long period time, because entry of water or other such solution into the interior of the magnetic force generating mechanism may lead to occurrence of short circuits at internal coils or the like, it is not unlikely that this could lead to trouble of the sort in which switching between the clamping state and the canceling state can no longer be carried out smoothly or the like.

While a major incident is of course not likely to occur immediately as a result of provision of sensors and other such safety measures implemented as a precaution against droppage incidents, it is nonetheless possible that it could become necessary to perform maintenance operations on the magnetic clamping device. Furthermore, because it is sometimes the case that die cleaning solutions and other such solutions contain surfactants, there is a tendency for these to enter interfacial boundaries.

A stable shield structure that is simple in structure and that has superior watertightness and will tend to prevent entry of solutions and the like from the securing surface of the magnetic clamping device is therefore desired.

In addition, because the magnetic clamping device is such that a multiplicity of magnetic force generating mechanisms are arrayed therein, connection must be made to the wiring of the respective magnetic force generating mechanisms, but where the structure is such that the wiring is exposed at the back, this will increase the tendency for liquid to enter the magnetic force generating mechanisms from the back, and there will be a tendency for the wiring to suffer harm.

Moreover, in as much as the structure performs clamping by means of magnetic force, and whereas the range of the influence of the magnetic force produced by the lines of magnetic force that are directed toward the die extends to a depth several tens of millimeters, in the event that there are excessive gaps between the plates at the securing surface, or there is occurrence of warping or deformation, such gaps will cause extreme reduction in clamping force. For example, occurrence of a gap of 0.5 mm will cause the clamping force exerted by the magnetic clamping device to be reduced to 60% or less of what it would otherwise be, and a gap of as much as 1 mm will cause the holding force to drop to on the order 15% of what it would otherwise be.

This being the case, notwithstanding that there may be ten or so magnetic force generating mechanisms provided thereat, if a portion thereof are not in close contact, it will be impossible to adequately provide the expected performance. This being the case, to reduce the gap between it and the die, ability to form the securing surface in flat fashion is desired so as to permit magnetic force to cause securing such that there is intimate contact therebetween.

It is therefore also desired that the structure be such as will facility ability to ensure flatness during manufacture and assembly of the magnetic clamping device at which a multiplicity of magnetic force generating mechanisms are provided at the interior thereof, and to moreover facilitate adjustment of flat surfaces during maintenance of the device. Furthermore, where such flat surfaces exist, there will be a tendency for cleaning solutions and other solutions to enter interfacial boundaries. There is thus a need for both the securing surface and the back to be provided with liquid-tightness.

However, with the magnetic tightening device of Patent Reference No. 1, a plurality of cylindrical housing openings are formed at a workpiece securing surface constituting the surface of a plate of a base member against which the workpiece will be tightened, magnetic forces generating mechanisms being respectively incorporated within the respective cylindrical housings, and as a need will arise to ensure that there is adequate flatness between the outer end faces of the plurality of cylindrical housings and the securing surface at the base member, a high degree of precision will be required when carrying out operations during machining of the bases of the cylindrical housings. Furthermore, because the cylindrical housings do not pass all the way therethrough, each had to be machined individually one-at-a-time, which cannot be described as efficient.

Inasmuch as the items that may be clamped thereby include dies used in injection molding, because there are situations in which the temperature reached by the die exceeds 100° C., heat may be conveyed to the securing surface, causing thermal expansion thereof. Now, at the magnetic force generating mechanism of Patent Reference No. 1, the structure is such that an outer peripheral groove is provided at the outer circumferential surface of a ring made of brass provided at the outer circumferential surface of a steel pole that abuts a workpiece, entrapment of an O-ring by this groove causing the ring to be inhibited from coming free and impinging on the outer surface. However, because the coefficient of thermal expansion of brass is higher than that of steel parts such as the baseplate and the steel pole, when heat from the die is conveyed thereto, the ring will expand and crowd the opening of the baseplate, which will tend to cause application of a load to the region surrounding the O-ring. It is moreover sometimes the case that thermal hardening of the O-ring leads to reduction in elasticity thereof, as a result of which there is a tendency for shield characteristics in the region surrounding the O-ring to grow worse. This being the case, this had caused there to be a worsening of the shield characteristics (water-tightness) in the region surrounding this ring.

As a strategy to address water-tightness, instead of providing a ring at the outside circumference of the outer surface of a circular cover body comprising a magnetic material, the Applicant has therefore invented a structure in which the outside circumference is made to be such that a collar is provided thereat in flange-like fashion (Japanese Patent Application No. 2016-245111; unpublished). While it is true that providing a collar of the same material improves water-tightness, due to the fact that it is the same material, it becomes necessary to give serious attention to control of magnetic flux. Furthermore, because the collar is a cantilever-like structure that protrudes in flange-like fashion, since application of a force thereon from the direction of the workpiece surface can result a situation in which there is a tendency for bending to occur and for the outer edge of the collar to be pressed inwardly thereinto, this has created a need to pay greater attention during use than had been the case previously, such as the fact that this has made it necessary to exercise caution so as not to cause damage the collar during attachment and removal of the workpiece and so forth.

Furthermore, at the integral magnetic device of Patent Reference No. 2, because the "support structure" and the "first pole piece core" are molded as a single part, there is no opening at the securing surface that secures the workpiece, and it is easy to ensure that there will be adequate flatness at the base member securing surface. Of course the processing necessary to achieve a structure in which the base member and the circular cover plate constitute an integral part at the securing surface cannot itself be described as being easy. Whereas it will be the case that processing for forming the housing holes will be carried out from the back, not only will it be necessary to remove material sufficient to permit creation of a space for housing of the electrical coil for the AlNiCo magnet at the back, but because it will also be necessary—with the circular cover plate still present in the central region thereof, and while suppressing transmission of vibrations to this circular cover plate—to form the groove for insertion of the nonreversible permanent magnets peripherally thereabout, the procedures involved for causing each of these housing holes to be formed one-at-a-time will be difficult.

Moreover, inasmuch as Patent Reference No. 2 is of integral construction, formation of the holes for the plurality of housing holes must be carried out from the back, and whereas these must be respectively formed so as to cause them to be at appropriate locations within the entirety, not only does this take time because these must be formed one-at-a-time due to the fact that it is of integral construction, but as the housing holes must be formed while taking into consideration how they are arranged within the entirety, this places a great burden on workers, such as the fact that control must be undertaken with respect to processing as carried out in the context of the entirety and so forth.

That is, where machining is used to form recessed housing holes such as are described above, among possible approaches that may be employed is one in which processing is performed by using a large-diameter drill to form a concave-bottomed hole, following which a small-diameter end mill is moved about in circular fashion so as to finish the concave-bottomed hole and cause the bottom surface thereof to be flat, as a result of which, because much time and trouble is required to process the entirety, it can be said that a structure in which there are integral housing holes is extremely disadvantageous from the standpoint of the fabrication thereof.

Note that whereas such openings may also be formed by a cutting operation in which trepanning (boring around a core which is left behind) is carried out, where such a simplified procedure is employed it will be difficult to achieve improvement in groove dimensional accuracy, and there will also be a tendency for surface roughness of the hollow portion to grow worse. In addition, with trepanning, because it will be difficult to properly maintain the gap between the baseplate and the core portion within the device, which will as a result lead to losses and/or decrease in magnetic flux. From the standpoint of ensuring proper clamping, as it cannot be said that use of trepanning alone is adequate, it has therefore been the case for maintenance of precision that troublesome processing for finishing had to be required.

Thus, while it is true with the integral magnetic device of Patent Reference No. 2 that because the base member and circular cover plate are connected in integral fashion by an annular magnetic circuit portion this is such as to permit liquid-tightness and flatness of the securing surface to be ensured, the processing required to achieve this is itself complicated and difficult. There is, moreover, no consideration for liquid-tightness at the back. Not only that, but because everything, including the annular magnetic circuit portion, is of flush and coplanar integral construction, it will also be the case when in the clamping state that 10% to 20% of the magnetic flux flows into the annular magnetic circuit portion. As a result, because this causes there to be a corresponding reduction in the force by which the object to be clamped is held during clamping, this has caused there to be an unavoidable reduction in clamping force.

Furthermore, while it is possible to carry out switching between a clamping state and a canceling state depending on the direction in which electricity is made to flow through a magnetic polarity switching coil, where the desired amount of clamping force is not produced when in the clamping state there is a danger that it will not be possible to secure the object to be clamped. It is therefore very important to be able to simply and appropriately ascertain whether or not the clamping state is satisfactory. By therefore installing a sensor coil or other such sensor or the like between the object to be clamped and the nonreversible permanent magnets, this will make it possible to easily ascertain that the magnetic flux is that of the clamping state. Of course, because it is ascertainment of the clamping state that is being carried out, since this means that the sensor will be arranged near the securing surface, due to the fact that it will be provided at a location straddled by the permanent magnets and the object to be clamped, consideration must furthermore be given to not inflicting damage on the sensor coil which is straddled thereby. A structure such as will permit simple and stable provision of a sensor coil such that damage is not inflicted thereon is therefore sought.

A problem to be solved by the present invention is therefore to provide a magnetic clamping device having a simple structure such as will permit a plurality of magnetic force generating mechanisms to be quickly and simply incorporated into a base member, the magnetic clamping device being such as to facilitate achievement of liquid-tightness at a securing surface for an object to be clamped, and to facilitate that it can be ensured that the securing surface will be a flat surface permitting high intimacy of contact therewith. It is furthermore to provide a magnetic clamping device having a structure such as will reduce the tendency for damage to occur in a peripheral region about an annular frame body, and such as will permit suppression of reduction in clamping force that would otherwise occur as a result of leakage of magnetic flux even when in a clamping state.

Means for Solving Problem

A first means in accordance with the present invention for solving the foregoing problems is a magnetic clamping device having a baseplate comprising soft magnetic material provided with a securing surface for holding an object to be clamped so as to abut one outer surface; a plurality of hollow housing portions that pass all the way therethrough from the securing surface thereof to the back being provided at this baseplate; one magnetic force generating mechanism being housed within each of the respective hollow housing portions; these magnetic force generating mechanisms each being such that a housing cover body comprising soft magnetic material is arranged centrally at the securing surface of the hollow housing portion, at a height which is coplanar with the securing surface of the baseplate, and in such fashion as to be separated from the hollow housing portion; a nonmagnetic metal frame body is arranged in the vicinity of the securing surface, at a portion separated from and between an outer edge portion at an inner wall of the hollow housing portion of the baseplate and an outer edge portion at the outside circumference of this housing cover body; at the back of this nonmagnetic metal flame body, a portion separated from and between the inner wall of the hollow housing portion and the housing cover body is made to serve as magnet housing space, multipartite nonreversible permanent magnets being housed therewithin in such fashion as to be arrayed along the outside circumference of the housing cover body; in a space remaining at a back portion within the hollow housing portion at which this housing cover body and these nonreversible permanent magnets arrayed along the outside circumference thereof are arranged, a reversible permanent magnet is arranged at a central region thereof in opposed fashion with respect to the housing cover body, a magnetic polarity switching coil for the reversible permanent magnet being arranged peripherally about this reversible permanent magnet; a back opening of the hollow housing portion at the baseplate is closed by a base cover body; plurality of the magnetic force generating mechanisms arranged within the baseplate; the magnetic clamping device being characterized in that the metal frame body is furthermore respectively joined in integral fashion to the baseplate at a location in the vicinity of the securing surface at the outer edge portion at the inner wall of the hollow housing portion, and to the housing cover body at a location in the vicinity of the outer edge portion at the outside circumference thereof.

Note that the hollow housing portions are such that the cross-sections thereof may be circular, quadrate, and/or polygonal.

A second means in accordance with the present invention is the magnetic clamping device according to the first means characterized in that the metal frame body is nonmagnetic steel.

A third means in accordance with the present invention is the magnetic clamping device according to the second means characterized in that the metal frame body furthermore is austenitic stainless steel in which S content is not greater than 0.030 mass %.

That is, in accordance with this means, the metal flame body is made from nonmagnetic austenitic stainless steel meeting the sulfur content limitation.

A fourth means in accordance with the present invention is the magnetic clamping device according to any one of the first through third means characterized in that the joining is carried out by means of metallurgical joining.

A fifth means in accordance with the present invention is the magnetic clamping device according to the fourth means characterized in that the joining is carried out by means of laser welding.

A sixth means in accordance with the present invention is the magnetic clamping device according to the fourth or fifth means characterized in that an outer surface of the metal frame body is such that an external dimension thereof is greater than a dimension at an inner circumferential wall in the vicinity of the securing surface at the magnet housing space of the baseplate, and an internal dimension of the metal frame body is less than an external dimension of the magnet housing space at the housing cover body; and an outer edge of the securing surface at the housing cover body and the baseplate are notched so as to conform to the metal frame body.

A seventh means in accordance with the present invention is the magnetic clamping device according to any one of the fourth through sixth means characterized in that characterized in that the hollow housing portion is a cylindrical hollow housing portion; the housing cover body is a circular cover body; and the metal frame body is an annular body.

An eighth means in accordance with the present invention is the clamping device according to any one of the fourth through seventh means characterized in that the metal frame body which is an annular body is provided with threaded grooves on at least one of an inner circumferential surface and an outer circumferential surface thereof, threaded engagement with threaded grooves on an outer edge portion of an inner circumferential surface of the baseplate or threaded grooves on an outer edge portion of an outer circumferential surface of the circular housing cover body permitting joining in integral fashion in an engaged state in the vicinity of the securing surface.

A ninth means in accordance with the present invention is the magnetic clamping device according to any one of the first through eighth means characterized in that the metal frame body is provided at the back thereof with a recess, width of the recess being less than thickness of the nonreversible permanent magnets; a detection coil that measures induced electromotive force being arranged within this recess.

A tenth means in accordance with the present invention is the magnetic clamping device according to any one of the first through ninth means characterized in that the metal frame body is arranged so as to be recessed relative to the baseplate, such that height of the front of that flame body is not flush with, being not coplanar with, height of the securing surface of the baseplate, and such that a shallow groove is formed at a portion above the metal frame body.

The metal frame body is not coplanar with the height of the securing surface of the baseplate but is located so as to be retracted slightly relative thereto.

Benefit of Invention

At the first means in accordance with the present invention, because a nonmagnetic metal frame body engaged between a housing cover body and a baseplate comprising soft magnetic material is joined in integral fashion to these in the vicinity of a securing surface, liquid-tightness of the securing surface is maintained, and because the metal frame body is a nonmagnetic body, there being no effect on the nonmagnetic body either during magnetized retention of the object to be clamped or during cancellation of magnetic flux when clamping is released, it is not lifted up therefrom as a result of being attracted to the object to be clamped, and because the metal frame body is such that the housing cover body and the baseplate are joined in integral fashion, the housing cover body is not pushed up toward the securing surface. Furthermore, due to the fact that it is a nonmagnetic metal frame body, whereas magnetic flux will pass through the object to be clamped during clamping, because there will be no leakage of magnetic flux into the nonmagnetic metal frame body, there will be no reduction in clamping force as would be the case were this a magnetic body, as a result of which appropriate formation of the clamping state will be facilitated.

Furthermore, where the object to be clamped is a die for an injection molding machine or the like, whereas there will be a tendency for this to be affected by heat, while the coefficient of thermal expansion of the nonmagnetic metal frame body differs from that of the steel at the soft magnetic material of the housing cover body and the baseplate, as a result of having been joined in integral fashion the metal frame body will tend not to be lifted up or displaced upward.

Furthermore, if the nonmagnetic metal frame body is nonmagnetic steel, it will be possible to accomplish joining in integral fashion by means of metallurgical joining to the steel at the soft magnetic material of the housing cover body and baseplate, and if the joining is carried out by means of laser welding, because heating will be limited to localized heating, not only will it be possible to obtain a strong joint as a result of the deep melting that occurs, the fact that the influence of heat can be kept to a minimum will make it possible to join dissimilar metals, making it possible to ensure that better liquid-tightness is achieved as a result of joining these in integral fashion than would be the case with adhesive or sealant.

Furthermore, if the metal frame body is austenitic stainless steel having low S content, because this will be nonmagnetic, have good corrosion resistance, and permit suppression of occurrence of S-containing nonmetal inclusions, there will be less tendency for occurrence of bad joints that would otherwise be produced due to laser welding as a result of S-containing nonmetal inclusions, and attainment of good joints will be facilitated.

Furthermore, because the coefficient of thermal expansion of stainless steel is less than, say, brass, it is appropriate for use even in environments in which heat is conveyed thereto, and because it tends not to corrode, it permits liquid-tightness to be maintained in stable fashion. Furthermore, whereas if the metal flame body is pressed on from the exterior by the object to be clamped it may become dented or scratched, because stainless steel is sturdy and is of high hardness it stands up well to impact and will permit use in stable fashion.

In accordance with the sixth means, it will not be the case that the metal frame body will be pressed into the interior or fall inwardly thereinto because an external dimension (outside diameter) of the metal frame body is greater than an external dimension (outside diameter) of the magnet housing space, or an internal dimension (inside diameter) of the metal frame body is less than an internal dimension (inside diameter) of the space by which the magnet housing space is separated therefrom. Because the danger that the metal frame body will be pressed into the interior will therefore be greatly reduced even when the object to be clamped or the like comes in contact with the metal frame body, it will have good ability to withstand inadvertent impact or the like due to contact from the exterior, which will make it possible for the locations of the metal flame body and of the housing cover body joined in integral fashion thereto to be appropriately maintained.

In accordance with the seventh means, because the metal frame body is an annular body and the shape of the hollow housing portion is cylindrical, the hollow housing portion can be formed by carrying out circular cutting at the desired location on the baseplate. For example, the procedure may be carried out simply, efficiently, and accurately by performing gas cutting and/or machining. This being the case, because if this is a hollow housing portion that goes all the way therethrough, this will make it possible for difficulty in processing to be reduced and will permit high accuracy in processing to be maintained, this will make it possible to easily obtain a hollow portion with good accuracy, and will dramatically improve the situation with respect to the cost of machining the baseplate.

Moreover, in accordance with the eighth means, because causing threaded grooves to be formed on the annular metal frame body will make it possible to cause the baseplate and/or housing cover body to be threadedly engaged such that there is engagement therewith, this will make it possible to widen tolerances with respect to dimensional accuracy. On the other hand, because it is possible by employing finer threaded grooves to cause clearance at meshing portions of threads to be made extremely small, it is possible by increasing thread precision to achieve satisfactory shield characteristics as a result of tightening of threads. As there will be no need to achieve engagement as a result of press-fitting of members having high dimensional accuracy, and as it will be possible achieve engagement and support as a result of threaded engagement prior to joining in integral fashion, this will make it possible to achieve improved efficiency during the joining operations for achieving integral construction that are carried out thereafter, and will permit operations to proceed expeditiously.

In accordance with the ninth means, a detection coil may be arranged in the space at a groove provided toward the interior from the back of the metal frame body. Moreover, because the width of the recess that houses the detection coil may be made less than the thickness of the nonreversible permanent magnets, it is possible to prevent the nonreversible permanent magnets from entering the recess, and to facilitate maintenance of the space. This being the case, because it will be the case that the detection coil which is installed within the recess will not be crushed by the nonreversible permanent magnets, it will be possible to properly ascertain that the clamping state has been appropriately formed as a result of polarity having been switched, and it will be possible to reduce occurrence of incidents in which the object to be clamped is accidentally dropped.

By, as at the tenth means, causing the metal frame body to be arranged not at a height which is coplanar with that of the securing surface of the baseplate but so as to be recessed slightly relative to, and be slightly toward the back from, the securing surface of the baseplate, it will be possible reduce the frequency of occurrence of contact with the object to be clamped and reduce the tendency for damage to occur. In the event of damage to the ring or the like of the metal frame body, it will not be possible, practically speaking, to perform maintenance operations. Preemptively causing the metal frame body to be even slightly offset and toward the back relative thereto will therefore permit reduction in the burden that might otherwise exist during maintenance operations and permit reduction in costs associated with management thereof. Furthermore, whereas there is a tendency when the object to be clamped is a die for pan injection molding machine for there to be an influence due to the heat therefrom, because the nonmagnetic metal name body does not come into direct contact with the object to be clamped due to presence of the shallow groove, this makes it possible to reduce somewhat the influence of the heat.

BRIEF DESCRIPTION OF DRAWINGS

FIG. 9 FIG. 9(a) is a plan view of a magnetic clamping device in which six magnetic force generating mechanisms associated with the second embodiment of the present invention at FIG. 8 are arranged in matrix-like fashion.

EMBODIMENTS FOR CARRYING OUT INVENTION

Figure 1:
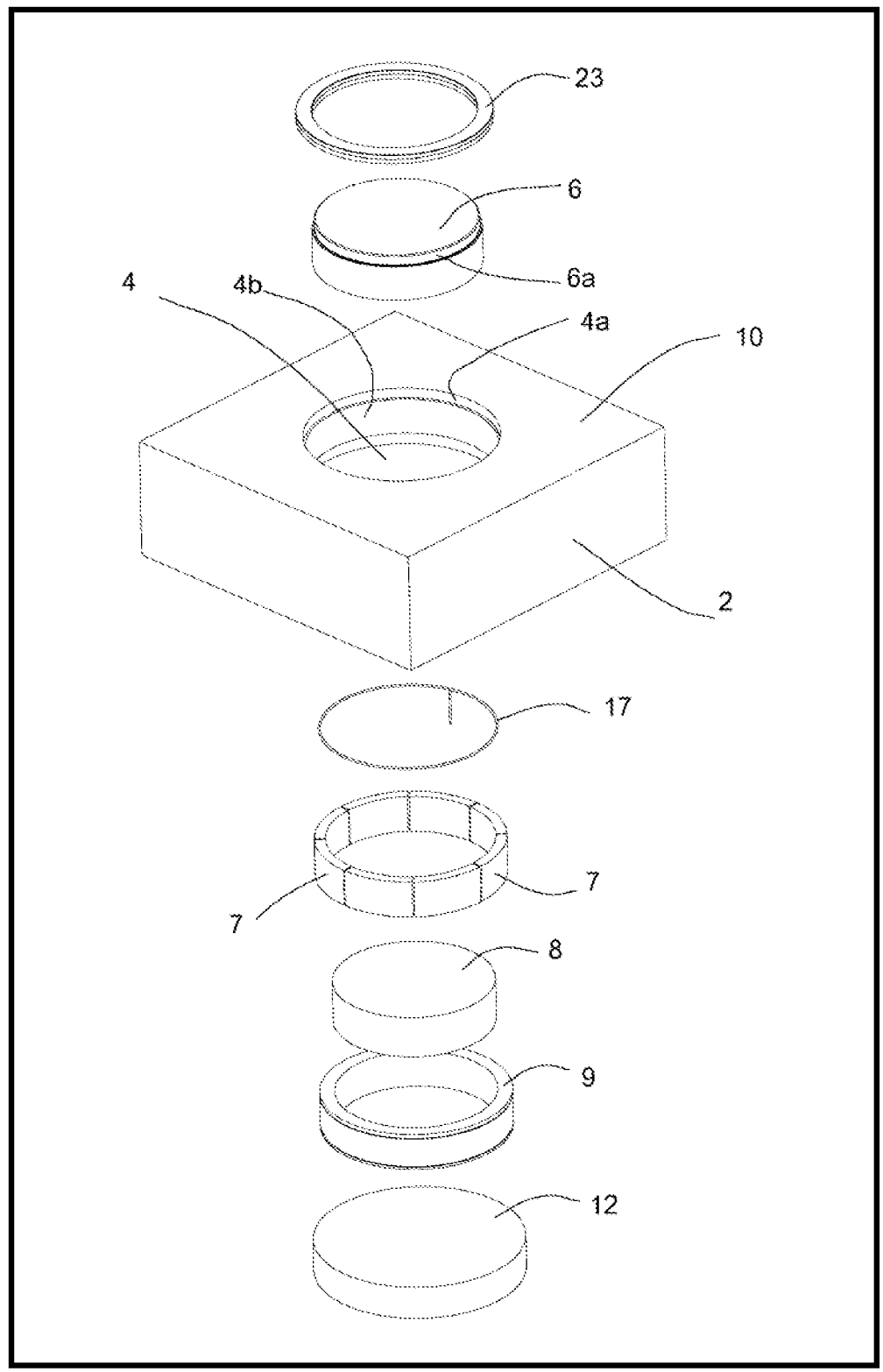
FIG. 1 Exploded perspective view of a magnetic force generating mechanism at a magnetic clamping device in accordance with a first embodiment of the present invention.
Figure 2:
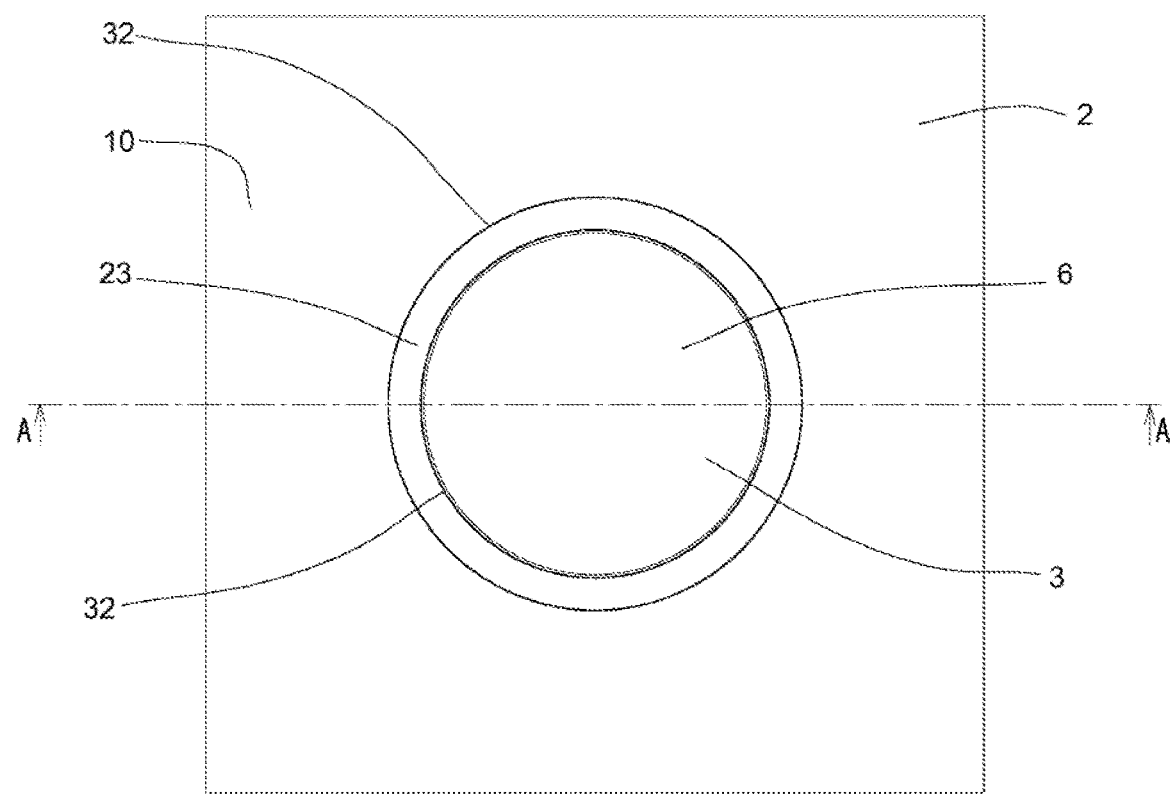
FIG. 2 Schematic plan view in which a portion of the baseplate at the magnetic clamping device of the first embodiment is shown in enlarged fashion as seen from the side thereof toward the securing surface.

Below, embodiments of the present invention are described with reference to the drawings where appropriate.

First, magnetic clamping device (1) is capable of causing an object to be clamped (30) to be secured by magnetic force in removably attachable fashion by means of a baseplate (2) to which the object to be clamped (a die for an injection molding machine, a workpiece that is to be subjected to machining, etc.) (30) is secured such that a securing surface (10) toward the front thereof serves as clamping surface, and magnetic force generating mechanisms (3) which are housed within, for example, on the order of four to fifty respective separated hollow housing portions (4) at openings formed within this baseplate (2).

While the shape(s) of the openings at the hollow housing portions (4) might be circular, rectangular, and/or polygonal, the description below is given in terms of an example in which these are circular, which is to say that the basic shape of the hollow housing portion (4) is cylindrical. Note that this should be understood to include not only those in which the shape is such that the outside diameter of the cylinder is constant in the depth direction but also those that are of multistage shape with varying outside diameter.

Figure 7:
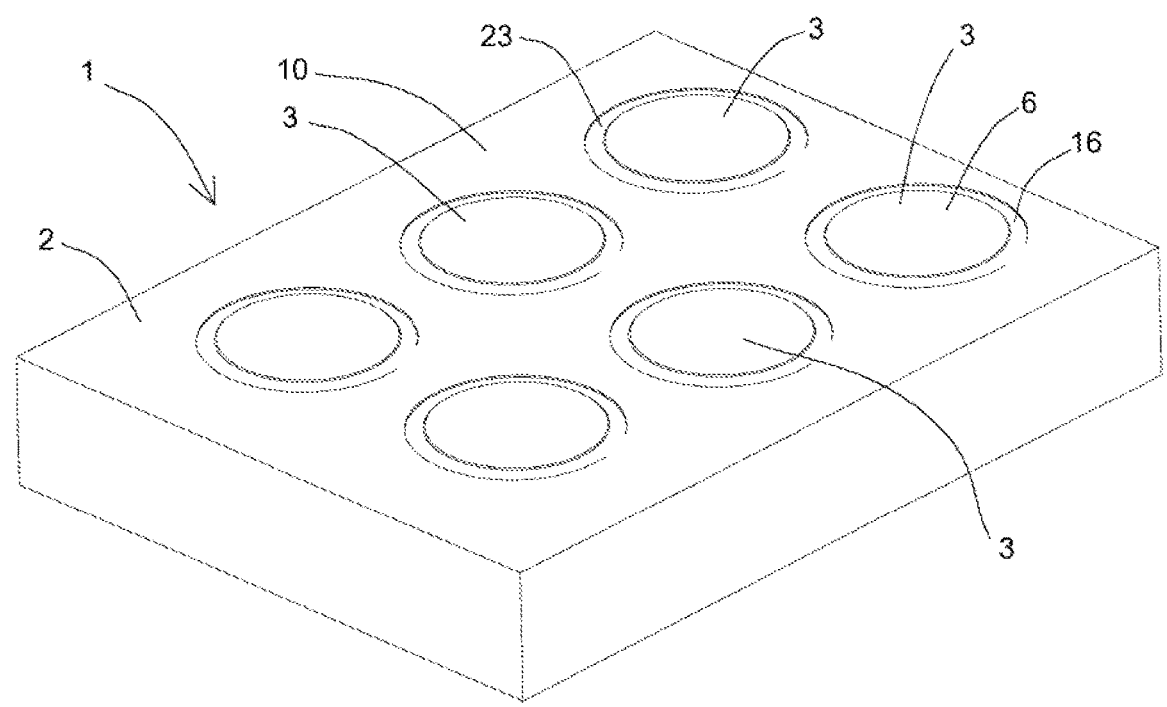
FIG. 7 Drawing in which six magnetic force generating mechanisms are installed at a magnetic clamping device in accordance with the first embodiment of the present invention.
Figure 8:
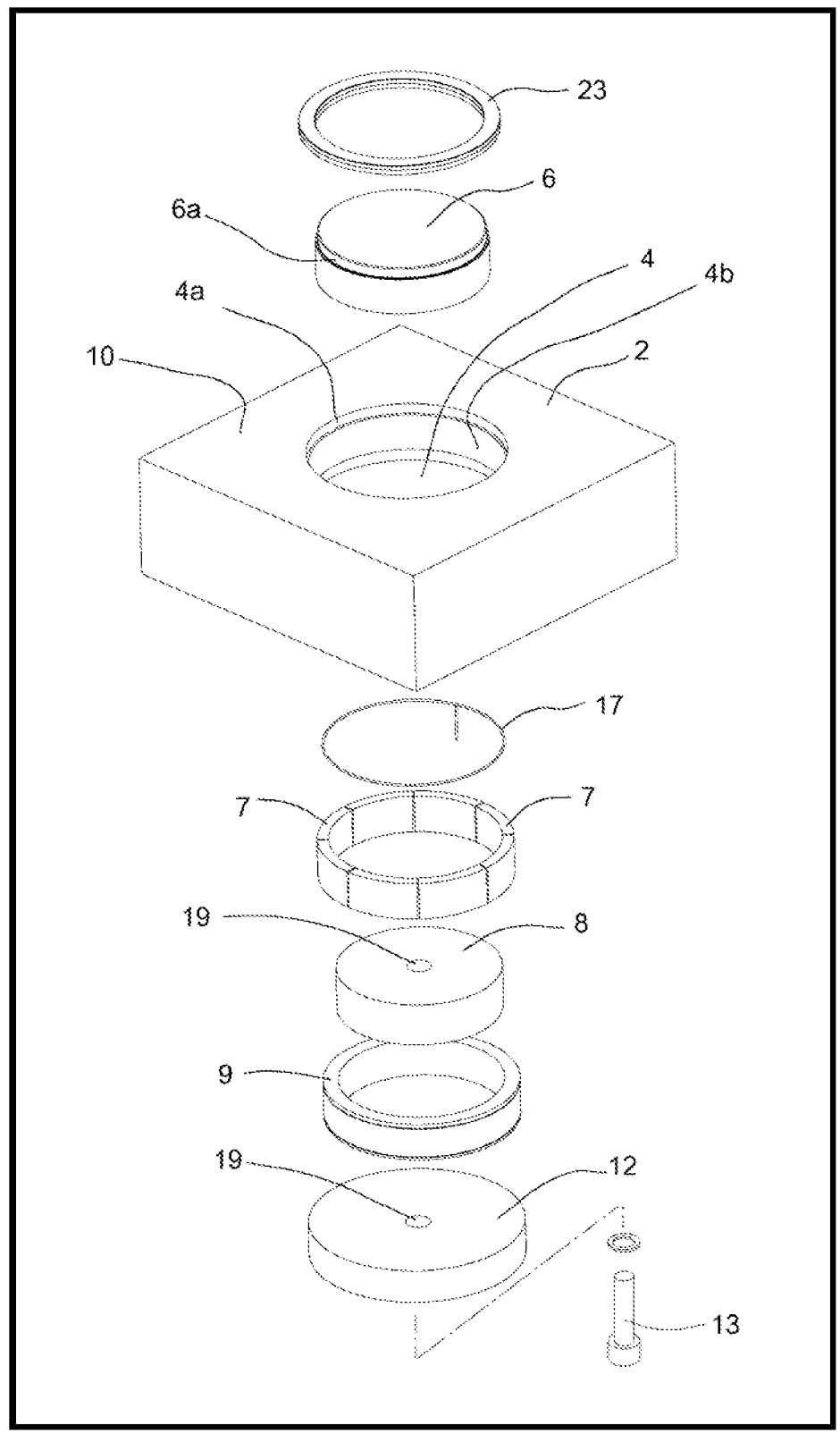
FIG. 8 Exploded perspective view of a magnetic force generating mechanism at a magnetic clamping device in accordance with a second embodiment of the present invention (embodiment in which securing is achieved by means of a bolt extending from the side thereof toward the base).
Figure 9A:
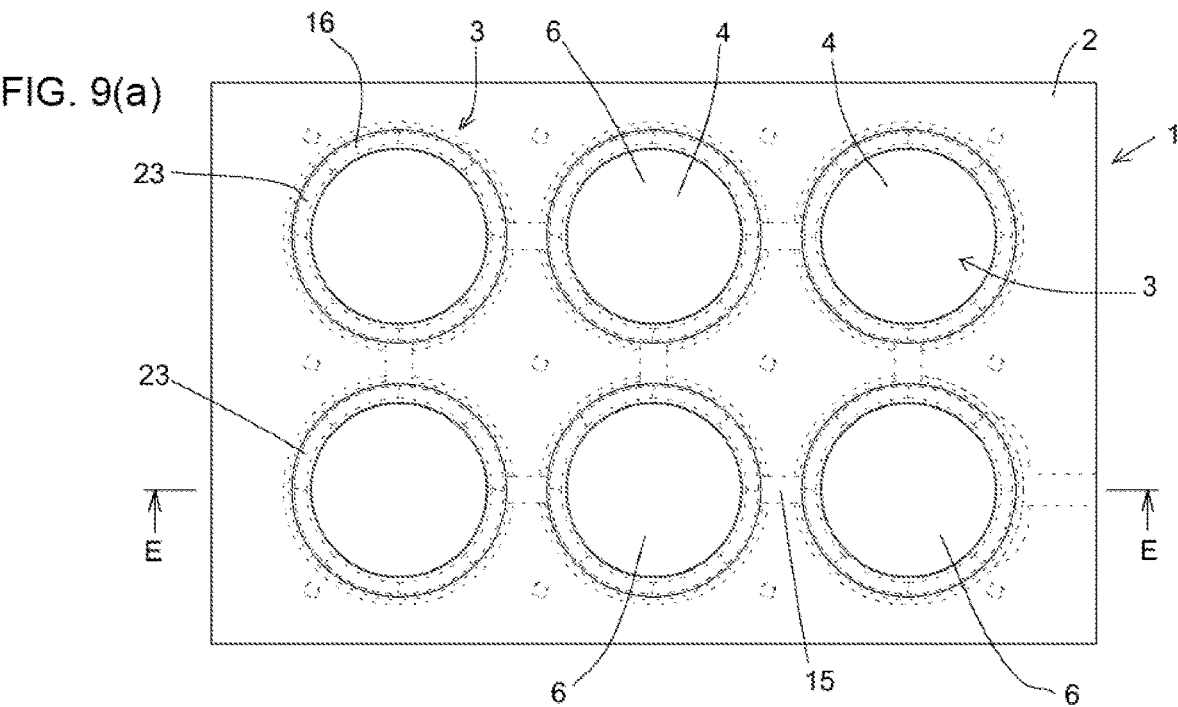
Figure 9B:
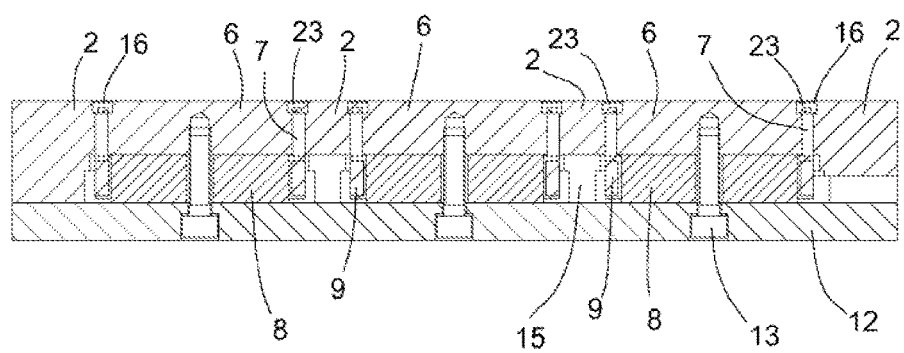
FIG. 9(b) is a sectional view of section E-E at FIG. 9(a). Sectional view of section E-E.
Figure 10:
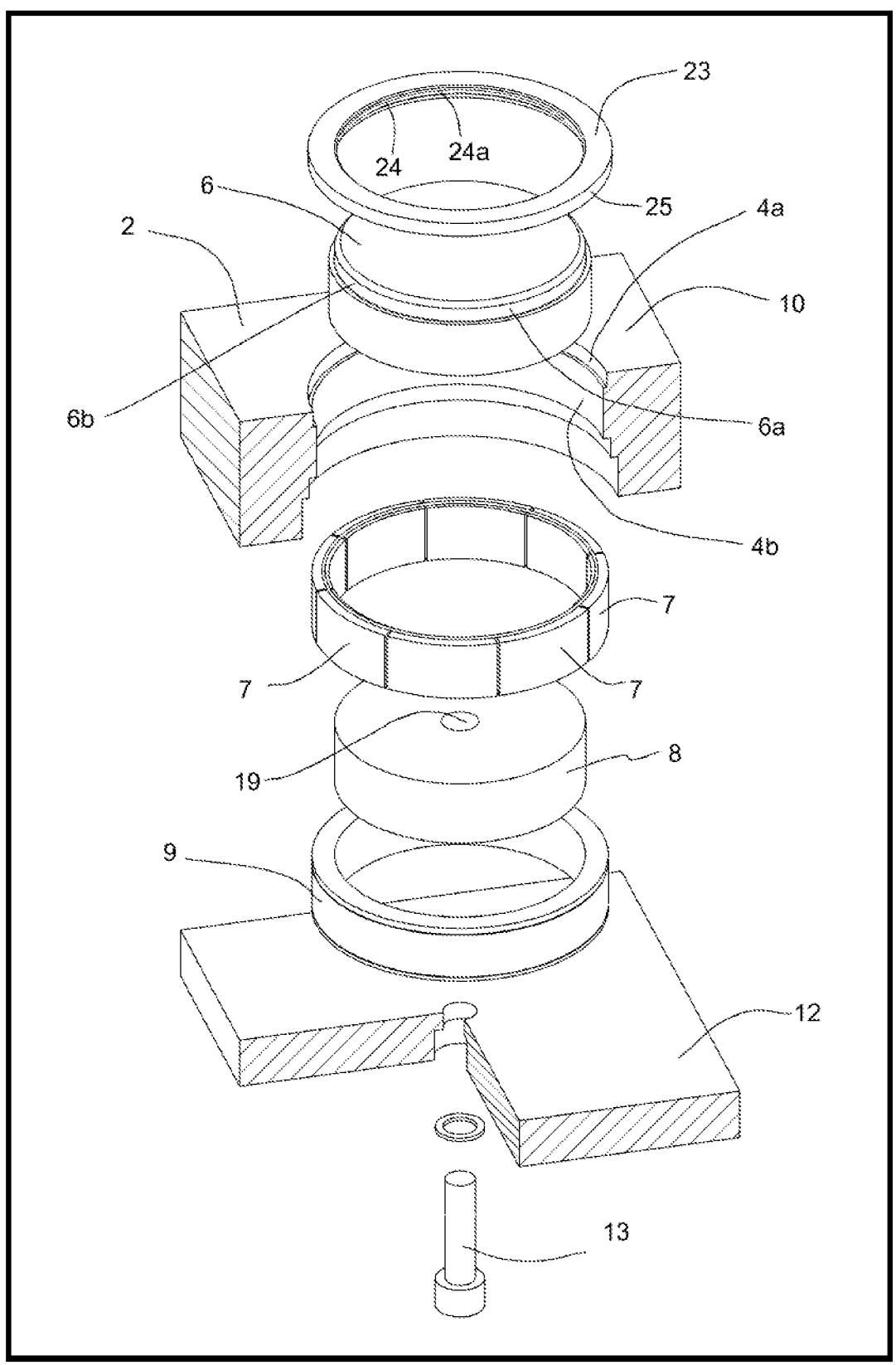
FIG. 10 Exploded perspective view of a magnetic force generating mechanism at a magnetic clamping device in accordance with a third embodiment of the present invention (embodiment in which a base cover body abuts the entirety of the back of the baseplate).

Furthermore, FIG. 7 shows an example of a magnetic clamping device (1) in which two rows of three, i.e., six, hollow housing portions (4) are provided at a baseplate (2), the six magnetic force generating mechanisms operating in coordinated fashion. It being possible for the number and arrayal of the magnetic force generating mechanisms to be chosen in correspondence to the shape, weight, and so forth of the object to be clamped, this is of course not limited to the arrayal that is shown by way of example.

Note that the magnetic clamping device (1) of the present application is such that the clamping surface may be positioned in such orientation that it is a top surface, bottom surface, or vertical surface.

Whereas the description that follows is given in terms of an example in which, following the arrangement that is shown in the drawings, the positional relationship described is such that the clamping surface, i.e., the surface (10) to which the object to be clamped is secured, is at the top, and the magnetic clamping device attachment portion (31) at which the base cover body (12) is disposed is at the bottom, the orientation of the securing surface (10) at which clamping is carried out having been employed merely for purposes of description, it should be understood that there is no limitation with respect thereto.

Furthermore, although specific values may for convenience be indicated in the description below, it should be understood that such values are mere examples and that there is no limitation with respect thereto.

Brief description will first be given with respect to the constitution of magnetic force generating mechanism (3). When securing surface (10) of baseplate (2) is located at the top surface, one magnetic force generating mechanism (3) is housed within each of the respective hollow housing portions (4) at openings formed in baseplate (2).

Note that whereas the working examples shown at FIG. 1 and thereafter are described in terms of examples in which the fact that the hollow housing portions are cylindrical means that the end faces of the openings are circular, except for the situation in which the metal frame body is an annular body in the context of a constitution in which threaded engagement of threaded parts is accompanied by rotary motion, application thereof may also be made to situations in which the end faces are shaped such that quadrate and/or polygonal openings are formed therein.

A magnetic force generating mechanism in accordance with the present invention is provided with a magnetic polarity switching coil for reversing the magnetic polarity of an AlNiCo magnet or other such reversible permanent magnet, it being possible by causing electricity to flow therethrough to cause reversal of magnetic polarity and switching between a canceling state and a clamping state, and it being possible for such reversal of state to persist even after the flow of electricity therethrough has been terminated.

Now, at FIG. 1, at this magnetic force generating mechanism (3), there are, in order from the top, from the side toward the securing surface to the back: a centrally arranged cylindrical housing cover body (6); an annular nonmagnetic metal frame body (23) arranged peripherally thereabout; a multiplicity of nonreversible permanent magnets (7) arranged in annular fashion (or in quadrate fashion where the end face is quadrate) at the outside circumference of the housing cover body (6) in a magnet housing space (14) beneath the nonmagnetic metal frame body (23) (and where annular, the magnetic poles of the nonreversible magnets (7) are respectively located at the outside circumference and inside circumference); an AlNiCo magnet which is a reversible permanent magnet (8) that is arranged directly beneath the housing cover body (6) in such fashion that the magnetic poles thereof are in the vertical direction; and an AlNiCo magnet magnetic polarity switching coil (9) that is wound peripherally about the AlNiCo magnet in such fashion that electricity can be made to flow therethrough.

Figure 3:
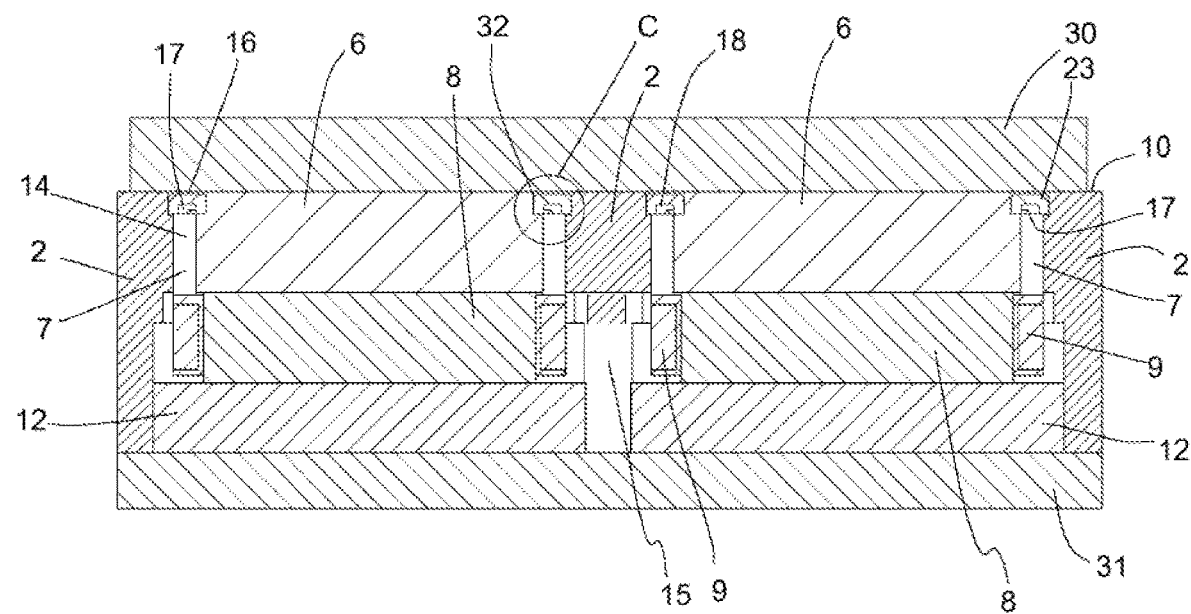
FIG. 3 Sectional view of section A-A at the magnetic force generating mechanism of the first embodiment.

In addition, at FIG. 1 and FIG. 3, a base cover body (12) is arranged at the back of the baseplate and closes off the hollow housing portion (4) of the baseplate (2) from the back. The shape of the base cover body may be such as to conform to that of the opening, and/or may be such as to cover the entirety of the back of the baseplate.

Moreover, as it may be the case that housing cover body (6) is prevented from coming free and emerging beyond securing surface (10) by a securing bolt (13) that penetrates reversible permanent magnet (8) from base cover body (12), being inserted therewithin so as to pass therethrough in such fashion as to reach the back of the housing cover body (6) at which it is fastened, the shape thereof should not be such as to interfere with securing bolt (13). But note in accordance with the present invention that where the nonmagnetic metal frame body (23) is such that an outer edge at a top portion thereof is such that an outer edge portion (4a) of an inner wall at the hollow housing portion of the baseplate (2), and an inner edge at a top portion of the metal frame body (23) is such that an outer edge portion (6a) of the housing cover body, are respectively joined in integral fashion, so that these are made to be integral as a result of laser welding or the like, it will not necessarily be the case that fastening need be carried out by means of a securing bolt (13) that extends from a location toward the base, and it will be possible to adopt a constitution such as will permit the inconvenience of achieving fastening by means of such a securing bolt to be eliminated.

That is, base cover body (12) may cover hollow housing portion (4) from the back of baseplate (2) so as to occlude opening (5) at the back portion of hollow housing portion (4) of baseplate (2). Furthermore, because base cover body (12) is a soft magnetic material, it is also retained as a result of being attracted to reversible permanent magnet (8), i.e., the AlNiCo magnet, which is arranged at a location opposed to the base cover body. Because base cover body (12) also serves in the role of preventing leaking magnetic flux from impinging on magnetic clamping device attachment portion (31) from the back it should be a soft magnetic material of some thickness; for example, the thickness of base cover body (12) might be 15 mm. While the AlNiCo magnet is such that magnetic polarity may be reversed to achieve reversible switching between a clamping state and a canceling state when the region thereof that is made to come in contact with housing cover body (6) or base cover body (12) is either the N pole or the S pole, under either polarity scenario it will be the case that the housing cover body (6) and the base cover body (12) which are disposed in opposed fashion at either end thereof will be respectively attracted theretoward.

Now, baseplate (2) and housing cover body (6) might, for example, employ low-carbon steel which is a soft magnetic material. Note that because low-carbon steel is such that it exhibits almost no hardening despite being subjected to heating/cooling processes, even where joining is carried out by means of welding it will be possible to do this in such fashion as to have little effect on that which is referred to as the "core." In addition, while this will depend on the weight that is capable of being clamped for which the device has been designed, thickness of the plate making up the baseplate might, for example, be on the order of 30 mm to 60 mm. The description that follows is described in terms of an example in which thickness of baseplate (2) is 38 mm. Note that while the shape of baseplate (2) is ordinarily that of a rectangle, square, or other such rectangular shape, so long as the securing surface is flat, there is no limitation with respect thereto.

In addition, baseplate (2) is provided with a multiplicity of hollow housing portions (4) that extend all the way through the thickness direction, from securing surface (10) serving as the clamping surface to the back (11) of baseplate (2). For example, the diameter of hollow housing portion (4) might be such that the portion that houses the nonreversible permanent magnets is 78 mm. In addition, locations may be provided at which the diameter of hollow housing portion (4) varies in the depth direction; for example, this might be made to have a multistage shape such that the outer edge portion (4a) of the inner wall of the hollow housing portion in the vicinity of the securing surface is 80 mm in diameter, the portion that houses the nonreversible permanent magnets is 78 mm in diameter, and diameter at the back opening portion (5) is 86 mm. In addition, adjacent hollow housing portions (4) might, for example, be separated by on the order of 15 mm to 20 mm (meaning that the distance mutually separating respective centers of hollow housing portions might be on the order of 95 mm to 100 mm). Moreover, passage(s) (15) for wiring are formed within the baseplate at location(s) between respective hollow housing portions.

Moreover, regarding the structure of baseplate (2), in a situation in which circular openings are employed, while it is sometimes the case that the inside diameter is made somewhat smaller at central portions, because the opening of hollow housing portion (4) is in the shape of a cylinder that extends all the way therethrough, due to the fact that there will be no need for complicated machining, and due to the fact that there will be no need to use a small-diameter end mill to carry out machining, it will be possible to form hollow housing portion (4) in simple and inexpensive fashion. Because the surface of the securing surface of the baseplate is a smooth surface, it facilitates efficient production of clamping force.

A region toward the front of hollow housing portion (4), i.e., the outer edge portion (4a) at the inner wall of the hollow housing portion in the vicinity of the securing surface of baseplate (2), is such that a groove which is 1 mm in width is cut thereinto for a depth of 4.7 min, such that the outside diameter of the opening is 80 mm only in the vicinity of the securing surface. This groove which is 1 mm in width is such as to permit mating in threadedly engaged fashion by the annular outside circumferential portion of nonmagnetic metal frame body (23). Note that if thickness of nonmagnetic metal frame body (23) is, for example, made to be 4.2 mm, it will be possible to cause nonmagnetic metal frame body (23) to be disposed at a location that is recessed by 0.5 mm relative to securing surface (10).

In addition, a cylindrical housing cover body (6) having a thickness of 20 min and an outside diameter of 70 mm is arranged at a central portion in the region toward the securing surface of hollow housing portion (4). Moreover, the outside diameter of the outer edge portion (6a) at the outside circumference of the region toward the securing surface of housing cover body (6) is 66 min for a depth of 4.7 mm, and a male-threaded (6b) threaded groove that is 0.5 mm in width is provided at the circumferential wall at which thickness has been reduced by a width of 2 mm. Female threads (24a) are provided at an inner circumferential portion (24) of nonmagnetic metal frame body (23) so as to permit threaded engagement by those male threads, the female threads (24a) and the male threads (6b) mating in threadedly engaged fashion at a part of the inner circumferential portion (24) of the metal frame body when the nonmagnetic metal frame body (23) is captured and secured between the outer edge portion (6a) at the outside circumference of the housing cover body (6) and the outer edge portion (4*a*) of the inner wall at the hollow housing portion of the baseplate.

While threaded engagement as a result of threaded grooves at the outside circumference or inside circumference of this nonmagnetic metal frame body (23) is not necessarily required in the present invention, where threaded engagement is employed, greater allowance may be made for tolerances than would be the case were securing to be accomplished as a result of press-fitting this thereinto such that there is no intervening gap therebetween. Furthermore, when carrying out joining in integral fashion as a result of laser welding or the like, where threads are employed to achieve threaded engagement, because it will be possible to cause the annular body of the metal frame body (23) to be mated with respect thereto while causing rotation to be carried out to a location at a prescribed depth, manufacturability will be good. Moreover, by using laser welding to achieve localized melting to considerable depth, it will be possible to achieve firmer joining. At melted locations (32), melting has been carried out to considerable depth.

What is referred to as joining in the context of the present invention includes shrink-fitting and other such mechanical joining, joining by means of adhesives, and metallurgical joining, it being possible to employ any technique so long as it will permit the metal frame body and the housing cover body and/or baseplate to be joined in integral fashion and will make it possible to obtain a liquid-tight shield. Furthermore, what is referred to as metallurgical joining includes gas welding, arc welding, laser welding, and other such welding such as will produce molten integration, resistance welding, forge welding, friction welding, and other such compressive contact such as will produce integration, soldering, brazing, and other such soldering- or brazing-like joining such as will produce integration, and so forth.

What is referred to as brazing is a method of joining base materials in which bonding of base materials and brazing material occurs during the course of a process in which melting of base materials does not occur but the space between base materials is penetrated as a result of capillary action due to the phenomenon of wetting by molten brazing material. For example, where brazing is carried out in a furnace, joining might be achieved through employment of a propositioning method in which the brazing material and flux are placed in advance on the materials to be brazed.

Of course, because it will be necessary to procure a furnace of size sufficient to accommodate the entirety of the joined regions of the magnetic force generating mechanisms, i.e., a furnace large enough to accommodate a magnetic clamping device at which a plurality of magnetic force generating mechanisms are arranged, this will be a large-scale operation. Furthermore, because it will be necessary for joining by means of brazing to have been carried out prior to assembly of the sensors with their wiring, the coils for the electromagnets, and so forth, as this will impose restrictions on the procedures that are employed for assembly of the magnetic three generating mechanisms, this will result in a reduction in the degrees of freedom.

What is referred to as laser welding is a joining method in which melting of base materials is made to occur as a result of pulsed and/or continuous irradiation of base materials by, for example, a carbon dioxide gas laser. YAG laser, or other such laser light of high power density that has been condensed thereon. Where laser welding is employed, localized power density being high, it will be possible to obtain laser-melted/-welded portions of shape such that melting has occurred to considerable depth and having small bead width due to keyhole production. As this will therefore be such that, as compared with arc welding which produces shallow melting over a wide area, it will be possible to achieve joining in which width of the molten cross-section is small and melting occurs to considerable depth, in situations such as that of the present invention in which members of considerable thickness are to be inserted and welded, laser welding is favorably employed.

In addition, a YAG laser, i.e., a laser employing $Nd^{3+}$: $Y_3Al_5O_{12}$ garnet as light-emitting material, might, for example, be favorably adopted to carry out laser welding in accordance with the present invention.

In addition, because it will be possible to carry out joining such that two metals, i.e., stainless steel and steel which is a soft magnetic material, are melted in such fashion that width of the bead is small and depth is to several millimeters, it will be possible to obtain adequate joint strength. Note that whereas low-carbon steel may be employed at the housing cover body, because low-carbon steel is such that it exhibits almost no hardening despite being subjected to heating/cooling processes, even where joining is carried out by means of welding it will be possible to do this in such fashion as to have little effect on the core. Where, moreover, laser welding is employed, it will be possible to limit that effect to localized regions.

Now, what is referred to as the nonmagnetic metal frame body (23) employs a metal that is suitable for metallurgical joining and that is a nonmagnetic material which is not susceptible to the effects of magnetic fields so that it will not be the case that magnetic force passing through the frame body causes reduction in clamping force. For example, austenitic stainless steel, brass, and/or the like may be employed. Note that because the coefficient of thermal expansion of brass is high, stainless steel is preferred.

That is, as the nonmagnetic steel referred to in the context of the present invention, nonmagnetic alloy steels exhibiting austenite structures in which C, Mn, Ni, Cr, N, and/or the like are, for example, the principal alloying component(s) may be cited. These may be broadly categorized as being of the high-Ni type, of the high-Mn type, or of a type that is intermediate therebetween.

For example, as stainless steel of the high-Ni type, SUS303, SUS304, SUS316, and so forth may be cited as examples. Because SUS303 is an 18Cr—8Ni austenitic stainless steel having excellent machinability and extraordinary workability, it may easily be cut into rings and the like. Indeed, while it is easily cut because it contains not less than 0.15 mass % of S as machinability component, when welded together with low-carbon steel, because a high S content can cause segregation of the components thereof at grain boundaries, this mat cause occurrence of intergranular cracking and so forth, and there are situations in which cracking results in inappropriate welding. There are therefore situations in which welding is not necessarily easily performed, and it is difficult to obtain a simple joint by means of welding.

Of course, where laser welding is employed for joining, among austenitic stainless steels, those steels for which S component content is low are favorable. SUS304 being an 18Cr—8Ni austenitic stainless steel, because the S content thereof is low, being not greater than 0.030%, because it will be the case, even when laser-welded together with low-carbon steel, that there will tend not to be segregation of S-type inclusions, and there will tend not to be occurrence of cracking during welding, it is favorable for laser welding. Generally speaking, between SUS304 and SUS303, while SUS303 is superior with respect to workability in terms of ability to be worked into ring-like shape or for cutting of recesses therein, SUS304 is preferred over SUS303 for welding, and is also superior with respect thereto in terms of corrosion resistance. This is because the fact that austenitic stainless steels having low S content are nonmagnetic, have good corrosion resistance, and permit suppression of occurrence of S-containing nonmetal inclusions means that there will be less tendency for occurrence of bad joints that would otherwise be produced due to laser welding as a result of S-containing nonmetal inclusions.

Regarding SUS316, the magnetic permeability thereof tends not to increase despite its having undergone working, and there is little tendency for magnetization to be induced as a result of the strain which is produced by working thereof.

Furthermore, what is referred to as high-manganese steel is nonmagnetic alloy steel having an austenite structure in which Mn content is not less than 11%. It has high strength, is superior in terms of magnetic permeability stability, and because the Ni content thereof is low, it is also superior in terms of affordability. However, as there is a high degree of work hardening with high-Mn steel, there may be a tendency for it to exhibit poor machinability.

In a working example of the present invention, a nonmagnetic metal frame body was formed from austenitic stainless steel comprising SUS304, a YAG laser being used to laser-weld and join this with steel which was a soft magnetic material such that the depth of melting was 1.6 mm. There is no need to cause threaded grooves to be provided along the entire circumference; where laser welding is employed, note that it is possible to achieve integration with adequate joint strength merely by causing the metal frame body (23) to be press-fit between the hollow housing portion (4) and the housing cover body (6), and welding this by subjecting it to laser irradiation. Where threads are provided at the inner edge of the metal frame body, integration may be achieved by causing the outside circumference of the housing cover body (6) to be mated to the metal frame body (23), thereafter causing this to be press-fit into the hollow housing portion (4) of the baseplate, and thereafter subjecting this to laser irradiation.

To obtain adequate clamping force, note that the front of each magnetic force generating mechanism (3) is such that the surface height of cylindrical housing cover body (6) comprising soft magnetic material is made to be flush with the height of securing surface (10) of baseplate (2). More specifically, after the magnetic force generating mechanism has been housed therewithin, the surface of the clamping surface is moreover polished or the like so as to cause it to be made even more flush and coplanar therewith. At such time, because the nonmagnetic metal frame body (23) is located at a depth of 0.5 mm, the nonmagnetic metal frame body (23) is not an inconvenience and does not cause snagging during polishing, nor does it come in direct contact with the object to be clamped during use, and so by causing the nonmagnetic metal frame body (23) to be such that there is a shallow groove (16) of depth 0.5 mm makes it possible to reduce the tendency for damage to occur.

But where the securing surface is not coplanar therewith, occurrence of a gap between it and the object to be clamped of 0.5 mm will cause the clamping force exerted on the object to be clamped by the magnetic clamping device to be reduced to 60% or less of what it would otherwise be, and a gap of as much as 1 mm will cause the holding force to chop to on the order 15% of what it would otherwise be.

In this regard, because in accordance with the present invention the heights of housing cover body (6) and of securing surface (10) of baseplate (2) can be made flush and coplanar, retention without loss of clamping force is facilitated. On the other hand, because it is possible to provide shallow groove (16) such that there is a slight gap between nonmagnetic metal frame body (23) and securing surface (10), it is also possible to suppress damage due to contact with the object to be clamped, and because the nonmagnetic metal frame body does not leak magnetic flux, there is no leakage of magnetic flux in the vicinity of the securing surface, and there is no interference with the clamping force.

If, for the sake of comparison with the present invention, one were to consider the situation that would exist were the securing surface to be formed in integral fashion, from the baseplate to the housing cover body, from a single plate of soft magnetic material, while it may well be the case that it would be possible to maintain liquid-tightness of the securing surface, because this would result in a situation in which a magnetic material would be present between the nonreversible permanent magnets and the object to be clamped, there would be leakage of magnetic flux. As compared with the situation in which a nonmagnetic metal frame body is employed, it would therefore be unavoidable that there would be reduction in clamping force, and there would be a reduction in clamping efficiency. This being the case, it would be difficult to achieve decrease in thickness or reduction in the size of the clamping device, and increase in the size of the overall device would be unavoidable.

Next, because cylindrical housing cover body (6) is arranged at the center of hollow housing portion (4), it is separated by a distance of approximately 4 mm from the inner wall surface (4b) of the hollow housing portion, and the region that is directly beneath the nonmagnetic metal frame body (23) which is arranged in the vicinity of the securing surface forms a donut-like space that is separated therefrom, this annular space which is separated therefrom serving as magnet housing space (14). This annular magnet housing space (14) houses nonreversible permanent magnets (e.g., neodymium magnets) (7) comprising arcuate pieces of thickness 4 mm that have been split radially (e.g., split radially into eight pieces) and that when combined form an entirety of annular shape with outside diameter 78 mm, inside diameter 70 mm, and height 15 mm.

What is referred to as a nonreversible permanent magnet (7) in the context of the present invention is a high-coercivity ferrite magnet, neodymium magnet, or other such so-called permanent magnet, a neodymium magnet (Nd—Fe—B-type magnet) of high magnetization being preferred. The reason for this is that because use of a strong neodymium magnet will make it possible to achieve reduction in thickness, this will make it possible to achieve reduction in thickness of the overall magnetic clamping device that would be required for production of a clamping force. If thickness of the device is reduced, because this will make it easier to ensure that there will be sufficient movable space for the workpiece that serves as the object to be clamped, where this magnetic clamping device is employed in a die rotator or the like, this will also result in increase in the amount of peripheral space thereabout. Note that this neodymium magnet is a magnet whose magnetic poles, i.e., the N pole or the S pole, are made to face the outside circumference or the inside circumference.

Figure 4:
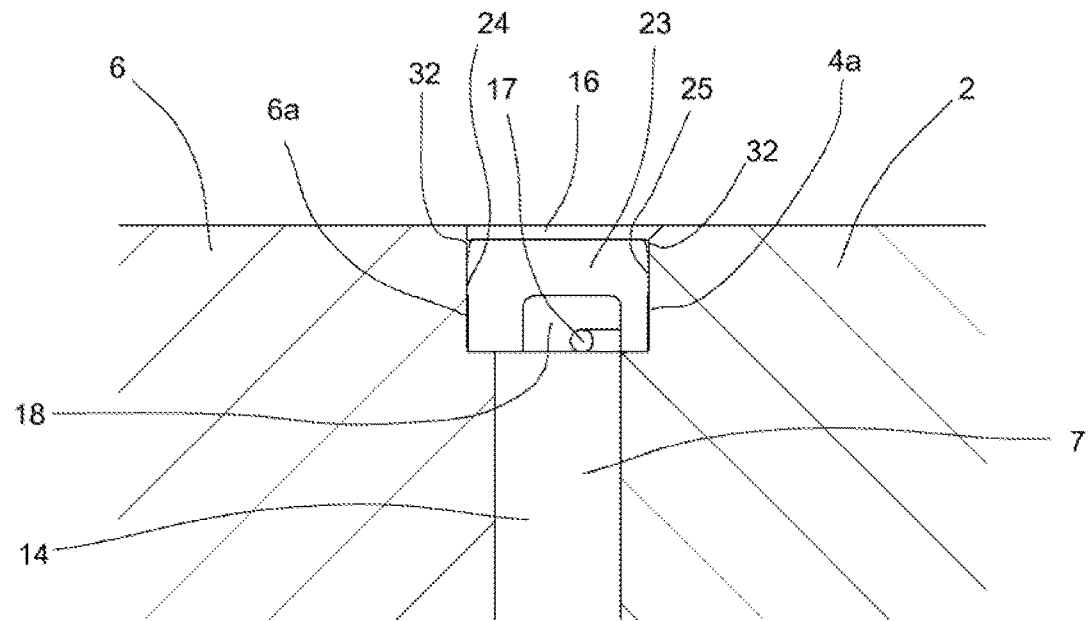
FIG. 4 Partial enlarged view in which the location at periphery C of the annular body in the magnetic force generating mechanism at FIG. 3 is shown enlarged by a factor of 4×.

Next, description will be given with respect to annular recess (18) which is formed at the back of metal frame body (23). FIG. 4 shows an enlarged view of the location at periphery C of the annular body shown in FIG. 3. At FIG. 4, the region to the left of nonmagnetic metal frame body (23), being the inside circumference, is housing cover body (6). Metal frame body (23) is of broader width than magnet housing space (14), annular recess (18) for housing detection coil (17) being provided at the back of metal frame body (23) at a location directly above magnet housing space (14). This metal frame body (23) is a nonmagnetic body, and might, for example, comprise austenite stainless steel.

For example, with an annular magnet housing space (14) of width approximately 4 mm to 4.5 mm because metal frame body (23) might be made to be of width slightly less than 7 mm, the inner circumferential portion (24) of the metal frame body might be threadedly engaged by means of threads (6b, 24a) with the outer edge portion (6a) at the outside circumference of the circular cover body, and the outer circumferential portion (25) of metal frame body (23) might be mated with the outer edge portion (4a) of the inner wall at the hollow housing portion such that this is shielded, metal frame body (12) will not fall into magnet housing space (14) which is of narrow width, and, even where the object to be clamped inadvertently collides therewith, the metal frame body (12) will not bend or break in the depth direction, and so there will tend to be no loss in terms of shield characteristics. In addition, as a result of application of sealant to threaded portion(s), and adhesive to outer circumferential portion(s) (25), these are further imparted with shield characteristics. In addition, as thread sealant for such sealing, nylon resin, silicone resin, alkyd resin, fluororesin, butyl rubber, or other such precoat-type sealant may be applied in advance to threads, it being possible to employ any of various substances for threaded engagement of threads. Furthermore, as adhesive for shielding, while adhesives suitable for causing adhesion between metals may be widely employed, for maintenance of shield characteristics, an adhesive that also possesses elasticity such as will permit compliance with thermal expansion is preferred.

Furthermore, if a gum-like sealant in which gum-like methacrylic acid ester containing curing catalyst such as will become entrapped by threaded grooves and curing agent microcapsules such as will be subject to release as a result of meshing of threads are blended is used, because it will be possible by applying this over several turns of the threaded grooves to cause this to be retained in threaded grooves and not flow away therefrom, curing agent released from microcapsules at locations against which tightening takes place during tightening thereof will cause curing to occur appropriately and will make it possible for appropriate seal characteristics to be obtained.

In addition, while it is preferred, because seal characteristics will be better when the error associated with meshing of threaded grooves is low, that machining thereof be carried out in as precise as fashion as possible, where sealant is used, by for example using a gum-like sealant in combination therewith, this will make it possible to ensure that constant seal characteristics are obtained without dependence on the precision of the clearance at the threads.

Moreover, whereas thickness of metal frame body (23) is 4.2 mm, an annular recess (18) of width 3 mm and depth slightly less than 2 mm is provided at the back thereof. Because width of this annular recess is less than the thickness which is on the order of 4 mm, of the nonreversible permanent magnets (7) that are disposed in annular arrangement, the nonreversible permanent magnets will not crowd that space. In addition, a detection coil (17) of diameter on the order of 0.8 mm is arranged within that annular recess.

In addition, when in the magnetized state that exists when in the clamping state, the detection coil (17) which is arranged within the annular recess (18) measures induced electromotive force and detects the strength of magnetic flux, as a result of which it is possible to ascertain whether the expected clamping force could be obtained, which makes it possible to ascertain whether there is a problem with the clamping state, making it possible to carry out clamping is safe fashion.

In addition, the nonreversible permanent magnets (7) (neodymium magnets) are split into on the order of three to eight equal arcuate shapes in such fashion as to conform to the shape of annular magnet housing space (14), being used in such fashion that they are arranged annularly so as to surround housing cover body (6) which is a soft magnetic material. While the drawings show working examples in which this is split into eight parts, there is no limitation with respect thereto. Orientations of magnetic poles within a single magnetic force generating mechanism are arranged in aligned fashion so as to cause the orientations of the magnetic poles of these magnets to be such that the inside circumference will be an N pole if the outside circumference is an S pole, and the inside circumference will be an S pole if the outside circumference is an N pole, Moreover, magnetic polarities at adjacent magnetic force generating mechanisms are arranged in such fashion as to be the reverse of each other, and it is also possible to cause adjacent magnetic force generating mechanisms (3, 3) to have magnetic polarities that are mutually different from each other.

What is referred to as a soft magnetic material in the context of the present invention is soft iron, low-carbon steel, silicon steel, Permalloy, or other such easily magnetized, low-coercivity, high-magnetic-permeability magnetic material. Descriptions of working examples of the present invention, for example, employ equivalent low-carbon steel for each of baseplate (2), housing cover body (6), and base cover body (12). Of course, all need not necessarily be the same material. Furthermore, so-called magnetic steel plate (s) comprising silicon steel may be employed.

Now, a housing cover body (6) comprising soft magnetic material is made to serve as core, neodymium magnets are arranged in annular fashion such that the magnetic poles thereof are aligned in the magnet housing space (14) at an outside circumferential portion thereabout, and a cylindrical AlNiCo magnet of diameter approximately 66 mm and thickness 18 mm, the upper base and lower base of which are the respective magnetic poles thereof, is arranged as reversible permanent magnet at the back of housing cover body (6). Note that a through-hole through which securing bolt (13) may be inserted is formed vertically at a central region of the magnet. In addition, magnetic polarity switching coil (9) is arranged about the outside circumference of the AlNiCo magnet, a base cover body (12) being located at the lower base of the AlNiCo magnet.

What is referred to as a reversible permanent magnet (8) in the context of the present invention is a magnet having properties such as will permit magnetic polarity thereof to be reversed when electricity is made to flow through the magnetic polarity switching coil (9) that is arranged about the periphery of the reversible permanent magnet, an AlNiCo magnet, for example, being favorably employed therefor.

Now, within baseplate (2), a plurality of magnetic force generating mechanisms (3) may be arrayed in parallel arrangement after the fashion of a matrix in which there are a plurality of rows and a plurality of columns (e.g., three rows and two columns). There is of course no limitation hereto, it being possible for six or less, or six or more, magnetic force generating mechanisms (3) to be incorporated therein after the fashion of a matrix in which there are a plurality of rows and a plurality of columns. Moreover, the plurality of magnetic force generating mechanisms (3) need not necessarily be arranged after the fashion of a matrix.

Adjacent magnetic force generating mechanisms (3) are arranged in proximate fashion, passages (15) for wiring for mutual coupling of wiring of magnetic polarity switching coils (9) arranged peripherally about AlNiCo magnets being formed so as to permit communication therebetween in central regions between adjacent hollow housing portions (4) in the column direction. Formed at the outside circumference of magnetic polarity switching coil (9) is a cylindrical space for installation of that wiring, communication with this cylindrical space being afforded by passage (15) for wiring. This makes it possible for wiring to be in communication without causing wiring to be exposed to the exterior of the base cover body. Following installation, excess gaps are filled with sealing material made from synthetic resin. Note, however, that the aforementioned sealing material is not essential and may be omitted. Because this plurality of magnetic force generating mechanisms (3) operate in mutually cooperative coordination, both the clamping state and the canceling state can be made to occur in simultaneous and linked fashion by causing electricity to flow through magnetic polarity switching coils (9).

Magnetic polarity of the AlNiCo magnet can be switched and reversed by causing electricity to flow through magnetic polarity switching coil (9) for a prescribed short time. Magnetic polarity switching coil (9) is wound multiple times around a synthetic resinous case member of grooved longitudinal cross-section, magnetic polarity switching coil (9) being constituted in such fashion as to permit application of a magnetic field in a perpendicular direction with respect to the AlNiCo magnet.

Respective hollow housing portions (4) and housing cover bodies (6) are inserted until the heights thereof are coplanar with the securing surface. At such time, the heights of the front of housing cover body (6) and of securing surface (10) of baseplate (2) are made flush. This is because the clamping force will not be adequately conveyed to the object to be clamped if a gap is present thereat. For example, occurrence of a gap of 0.5 mm will cause the clamping force exerted by the magnetic clamping device to be reduced to 60% or less of what it would otherwise be, and a gap of as much as 1 mm will cause the holding force to drop to on the order 15% of what it would otherwise be. While the housing cover body (6) will, when installed in the baseplate (2), be more or less of a height that is coplanar with the securing surface, it is therefore preferred so as to achieve further flatness of the surface, that the surface of the securing surface be subjected to polishing so as to cause it to be even flatter and more coplanar.

Moreover, at magnetic clamping device (1), after the respective constituent members of the magnetic force generating mechanism (3) have been sequentially arranged in stacked fashion within hollow housing portion (4) of baseplate (2), this is secured by causing base cover body (12) to be tightened together with housing cover body (6) by a securing bolt. As shown in the exploded diagram of FIG. 1, for example, AlNiCo magnet (8) might be arranged above base cover body (12), magnetic polarity switching coil (9) might be arranged peripherally thereabout, and further wiring of adjacent magnetic polarity switching coils (9) might be carried out by way of passage (15). In addition, housing cover body (6) might be stacked above reversible permanent magnet (AlNiCo magnet) (8), eight nonreversible permanent magnets (neodymium magnets) (7) might be sequentially inserted into the annular magnet housing space (14) which is disposed peripherally thereabout, following which detection coil (17) might be placed thereon, nonmagnetic metal frame body (23) might be inserted thereover from above, and this might be laser-welded. Note that connection of detection coil (17) might be achieved as a result of connection to wiring provided peripherally about magnetic polarity switching coil (9) and passing through gaps at the eight magnets. Because a plurality of magnetic force generating mechanisms are thus disposed in parallel arrangement, simultaneous switching between the canceling state and the clamping state can be achieved by cursing electricity to flow therethrough. Moreover, because passages for wiring are formed by causing regions between mutually adjacent hollow housing portions within the baseplate to be partially notched or by forming communication holes at the interior or the like so as to permit communication therebetween, wiring is not exposed to the exterior at either the securing surface or the back, not only making it possible to lower the risk of short circuits and the like and maintain shielding, but also making it easier to ensure stability of the overall device.

Next, action during clamping operations carried out by the foregoing magnetic clamping device (1) will be described.

Figure 5:
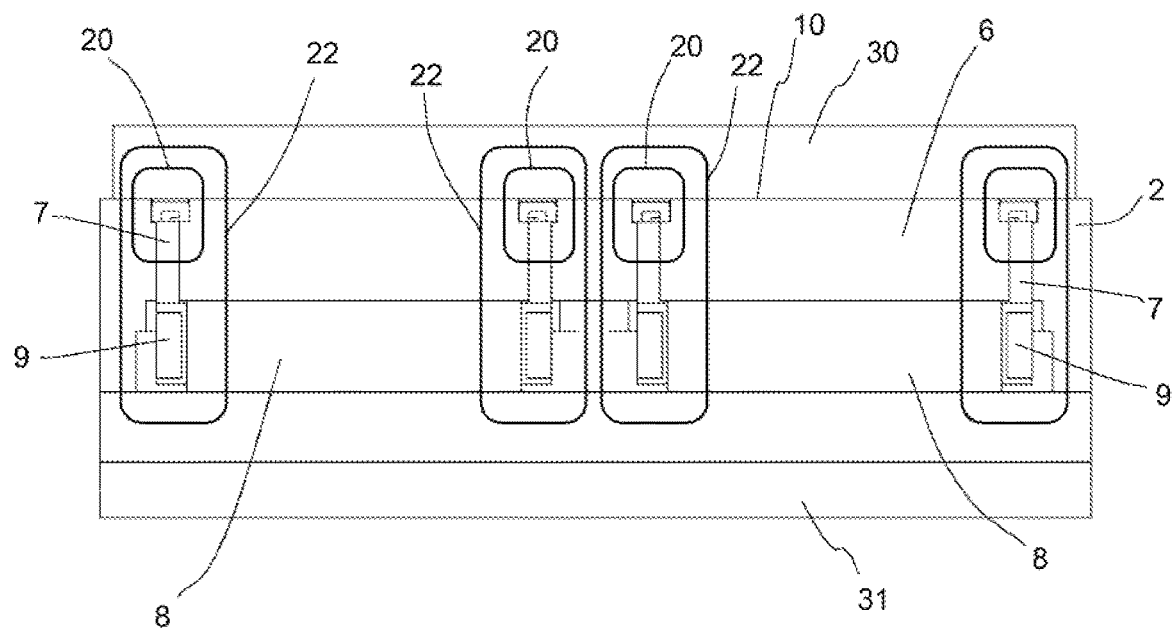
FIG. 5 Explanatory diagram for explaining in schematic fashion the path of magnetic flux at a time when a magnetic clamping device is in a clamping state.
Figure 6:
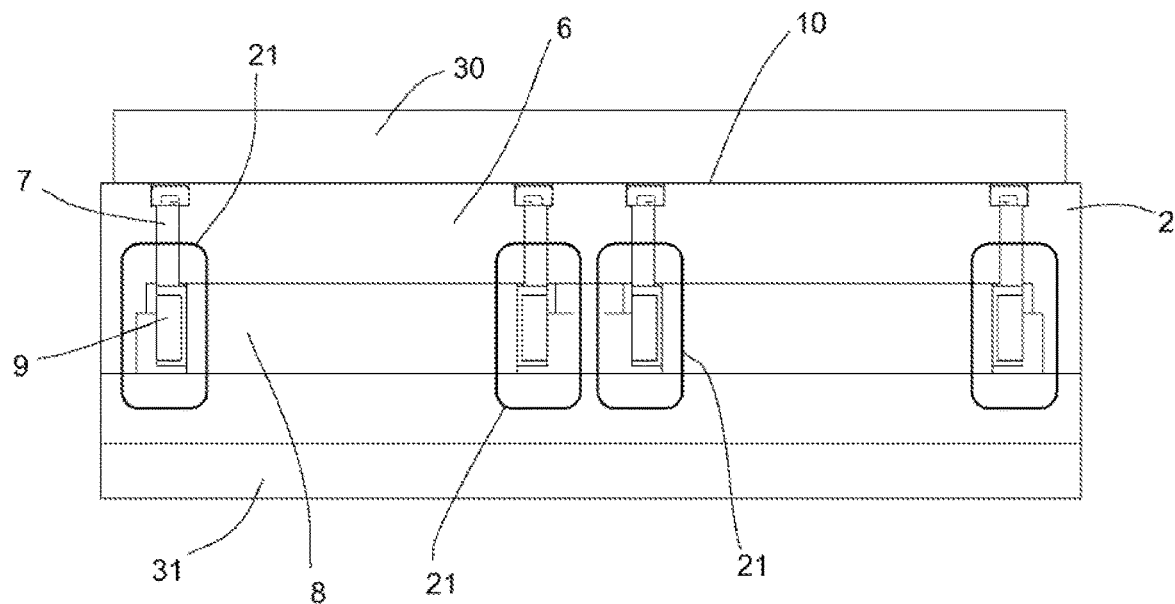
FIG. 6 Explanatory diagram for explaining in schematic fashion the path of magnetic flux at a time when a magnetic clamping device is in a canceling state.

First, magnetic clamping device (1) in accordance with the present invention is a device in which switching from the canceling state to the clamping state causes object to be clamped (30) to be held by magnetic force against securing surface (10), the switching operation causing the magnetic flux which is produced by magnetic polarity switching coil (9) to change the orientation of the magnetic poles at AlNiCo magnet (8). That is, when electric current is made to flow in a prescribed direction through magnetic polarity switching coil (9) for a short time, the direction of the magnetic field at AlNiCo magnet (8) is reversed, causing this to be switched from a state in which the magnetic flux (21) is in a canceling state as shown at FIG. 6 to a state in which the magnetic flax (20, 22) is as shown at FIG. 5. As a result, the magnetic flux (20) produced by permanent magnets (7) and the magnetic flux (22) produced by AlNiCo magnet (8) combine such that the path of magnetic flux becomes as shown in FIG. 5, the path of magnetic flux forming a closed loop by way of the object to be clamped (30) which comprises a magnetic body, causing this to be in a clamping state.

This causes the object to be clamped (30) to be held by magnetic forces against securing surface (10) of magnetic force generating mechanism (3) and baseplate (2) such that it is secured thereto by magnetic forces.

Furthermore, because nonmagnetic metal frame body (23) comprising a stainless steel nonmagnetic body is arranged above nonreversible permanent magnets (7), as it will be the case when in the clamping state that when magnetic flux is flowing through the object to be clamped (30), magnetic flux will tend not to leak into the nonmagnetic metal frame body (23) which is a nonmagnetic body or the shallow groove (16) which is the gap thereabove, there will be no decrease in clamping force.

When switching from the clamping state of FIG. 5 to the canceling state of FIG. 6, electric, current is made to flow, in a direction opposite that which was described above, through magnetic polarity switching coil (9) for a prescribed short duration of time (e.g., on the order of 0.5 second to 3 seconds). Upon so doing, the direction of the magnetic polarity of AlNiCo magnet (8) is reversed, and the magnetic field changes so as to become as shown at FIG. 6. The magnetic flux (20) produced by nonreversible permanent magnets (7) and the magnetic flux (21) produced by reversible permanent magnet (8) become as shown at FIG. 6, and canceling takes place. This being the case, because leakage of magnetic flux into the object to be clamped (30) is almost completely made to stop occurring, the clamp is released, making it possible for this to be easily removed from securing surface (10).

A magnetic clamping device (1) having the foregoing structure may be employed in a device such as a die rotator or the like in which it is used in such fashion that the baseplate (2) is made to be assume a horizontal orientation and either the top or bottom surface is made to serve as securing surface (10), with this then while still clamped being again being rotated top-to-bottom from the horizontal state so as to carry out flipping thereof. Furthermore, it may also be employed as the clamping portion in a clamping device that for securing a die at the movable or stationary plate of an injection molding machine in which baseplate (2) is made to stand vertically upright and the clamping surface is used as a vertical surface. Because the securing surface (10) of the present invention possesses liquid-tightness, as coolant for cooling or the like will tend not to enter the interior of the device, it may also be favorably employed at injection molding dies and the like.

EXPLANATION OF REFERENCE NUMERALS

1 Magnetic clamping device
2 Baseplate
3 Magnetic force generating mechanism
4 Hollow housing portion
4a Outer edge portion of inner wall at hollow housing portion
4b Inner wall surface of hollow housing portion
5 Back opening portion
6 Housing cover body
6a Outer edge portion
6b Male threads
7 Nonreversible permanent magnet (neodymium magnet)
8 Reversible permanent magnet (AlNiCo magnet)
9 Magnetic polarity switching coil
10 Securing surface (of baseplate)
11 Back (of baseplate)
12 Base cover body
13 Securing bolt
14 Magnet housing space
15 Passage for wiring
16 Shallow groove
17 Detection coil
18 Annular recess
19 Through-hole
20 Magnetic flux
21 Magnetic flux
22 Magnetic flux
23 Nonmagnetic metal frame body
24 Inner circumferential portion
24a Female threads
25 Outer circumferential portion
30 Object to be clamped
31 Magnetic clamping device attachment portion
32 Melted location

The invention claimed is:

1. A magnetic clamping device having a baseplate comprising soft magnetic material provided with a securing surface for holding an object to be clamped so as to abut one outer surface;
   a plurality of hollow housing portions that pass all the way therethrough from the securing surface thereof to the back being provided at this baseplate;
   one magnetic force generating mechanism being housed within each of the respective hollow housing portions;
   these magnetic force generating mechanisms each being such that
      a housing cover body comprising soft magnetic material is arranged centrally at the securing surface of the hollow housing portion, at a height which is coplanar with the securing surface of the baseplate, and in such fashion as to be separated from the hollow housing portion;
      a nonmagnetic metal frame body is arranged in the vicinity of the securing surface, at a portion separated from and between an outer edge portion at an inner wall of the hollow housing portion of the baseplate and an outer edge portion at the outside circumference of this housing cover body;
      at the back of this nonmagnetic metal frame body, a portion separated from and between the inner wall of the hollow housing portion and the housing cover body is made to serve as magnet housing space, multipartite nonreversible permanent magnets being housed therewithin in such fashion as to be arrayed along the outside circumference of the housing cover body;
      in a space remaining at a back portion within the hollow housing portion at which this housing cover body and these nonreversible permanent magnets arrayed along the outside circumference thereof are arranged, a reversible permanent magnet is arranged at a central region thereof in opposed fashion with respect to the housing cover body, a magnetic polarity switching coil for the reversible permanent magnet being arranged peripherally about this reversible permanent magnet;
      a back opening of the hollow housing portion at the baseplate is closed by a base cover body;
      a plurality of the magnetic force generating mechanisms being arranged within the baseplate;
      the magnetic clamping device being characterized in that the metal frame body is furthermore respectively joined in integral fashion to the baseplate at a location in the vicinity of the securing surface at the outer edge portion at the inner wall of the hollow housing portion, and to the housing cover body at a location in the vicinity of the outer edge portion at the outside circumference thereof.

2. The magnetic clamping device according to claim 1 characterized in that the metal frame body is nonmagnetic steel.

3. The magnetic clamping device according to claim 2 characterized in that the metal frame body furthermore is austenitic stainless steel in which S content is not greater than 0.030 mass %.

4. The magnetic clamping device according to claim 1 characterized in that the joining is carried out by means of metallurgical joining.

5. The magnetic clamping device according to claim 4 characterized in that the joining is carried out by means of laser welding.

6. The magnetic clamping device according to claim 4 characterized in that an outer surface of the metal frame body is such that an external dimension thereof is greater than a dimension at an inner circumferential wall in the vicinity of the securing surface at the magnet housing space of the baseplate, and an internal dimension of the metal frame body is less than an external dimension of the magnet housing space at the housing cover body; and an outer edge of the securing surface at the housing cover body and the baseplate are notched so as to conform to the metal frame body.

7. The magnetic clamping device according to claim 4 characterized in that the hollow housing portion is a cylindrical hollow housing portion; the housing cover body is a circular cover body; and the metal frame body is an annular body.

8. The clamping device according to claim 4 characterized in that the metal frame body which is an annular body is provided with threaded grooves on at least one of an inner circumferential surface and an outer circumferential surface thereof, threaded engagement with threaded grooves on an outer edge portion of an inner circumferential surface of the baseplate or threaded grooves on an outer edge portion of an outer circumferential surface of the circular housing cover body permitting joining in integral fashion in an engaged state in the vicinity of the securing surface.

9. The magnetic clamping device according to claim 1 characterized in that the metal frame body is provided at the back thereof with a recess, width of the recess being less than thickness of the nonreversible permanent magnets; a detection coil that measures induced electromotive force being arranged within this recess.

10. The magnetic clamping device according to claim 1 characterized in that the metal frame body is arranged so as to be recessed relative to the baseplate, such that height of the front of that frame body is not flush with, being not coplanar with, height of the securing surface of the baseplate, and such that a shallow groove is formed at a portion above the metal frame body.

\* \* \* \* \*